United States Patent
Lo et al.

(10) Patent No.: US 11,838,694 B1
(45) Date of Patent: Dec. 5, 2023

(54) HEAT DISSIPATION DEVICE FOR PROJECTOR

(71) Applicant: Young Optics Inc., Hsinchu (TW)

(72) Inventors: Wei-Cheng Lo, Hsinchu (TW); Yu-Ting Huang, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 0 days.

(21) Appl. No.: 17/874,217

(22) Filed: Jul. 26, 2022

(51) Int. Cl.
*H04N 9/31* (2006.01)
*G02B 5/04* (2006.01)

(52) U.S. Cl.
CPC ............. *H04N 9/3144* (2013.01); *G02B 5/04* (2013.01); *H04N 9/3197* (2013.01)

(58) Field of Classification Search
CPC ....... H04N 9/3144; H04N 9/3197; G02B 5/04
USPC .......................................................... 353/52
See application file for complete search history.

(56) References Cited

U.S. PATENT DOCUMENTS

2003/0123163 A1* 7/2003 Penn .................. G02B 26/0833
359/833

FOREIGN PATENT DOCUMENTS

TW          I356274          1/2012

* cited by examiner

*Primary Examiner* — Jerry L Brooks
(74) *Attorney, Agent, or Firm* — JCIPRNET

(57) ABSTRACT

A heat dissipation device for a projector includes a light source, a light valve, a prism set, a shading element, and a projection lens. The light source emits a light beam. The light valve is disposed downstream of a light path of the light source to receive the light beam, convert a part of the light beam into image light and another part of the light beam into an ineffective light beam. The prism set includes at least one prism, receiving the image light and the ineffective light beam. The shading element includes a heat dissipation part and is disposed downstream of a light path of the prism set and used to block the ineffective light beam from the prism set. The projection lens is disposed downstream of the light path of the prism set.

17 Claims, 4 Drawing Sheets

HEAT DISSIPATION DEVICE FOR PROJECTOR

BACKGROUND

Technical Field

The invention relates to a heat dissipation device, and particularly relates to a heat dissipation device for projector.

Description of Related Art

Generally, when an optical engine is in operation, light not projected out may hit a metal side wall of the optical engine and a shading plate above a prism, and the metal side wall is thermally expanded to cause displacement of optical elements, thereby causing image displacement, a so-called thermal drift phenomenon. In addition, the shading plate is a metal plate capable of shading light only, and the absorbed heat cannot be exported, so a temperature inside the optical engine may reach more than 100 degrees, which may result in the rise of a temperature of a lower cover of the optical machine in long time use, leading to metal expansion.

SUMMARY

The invention is directed to a heat dissipation device for projector, which is adapted to effectively mitigate a thermal drift phenomenon.

The invention provides a heat dissipation device for a projector, which includes a light source, a light valve, a prism set, a shading element and a projection lens. The light source emits a light beam. The light valve is disposed downstream of an optical path of the light source, and receives the light beam, and converts a part of the light beam into image light, and converts another part of the light beam into an ineffective light beam. The prism set includes at least one prism, which receives the image light and the ineffective light beam. The shading element includes a heat dissipation part. The shading element is disposed downstream of an optical path of the prism set, and is used to block the ineffective light beam from the prism set. The projection lens is disposed downstream of the optical path of the prism set.

The invention provides a heat dissipation device for a projector, which includes a light source, a spatial light modulator, a prism set, a projection lens and a shading element. The light source emits a light beam. The spatial light modulator is disposed downstream of an optical path of the light source, and converts the light beam into a first partial light beam and a second partial light beam. The prism set is disposed downstream of an optical path of the spatial light modulator. The projection lens is disposed downstream of an optical path of the prism set and the first partial light beam. The shading element includes a heat dissipation part, which is disposed downstream of an optical path of the prism set and the second partial light beam.

In an embodiment of the invention, the prism set is disposed in an optical engine cover.

In an embodiment of the invention, the heat dissipation device for the projector further includes a heat insulation element, which is disposed between the shading element and the optical engine cover.

In an embodiment of the invention, the heat insulation element includes a rubber part or a plastic part.

In an embodiment of the invention, the heat dissipation device for the projector further includes a projection lens locking shell, which directly or indirectly locks the projection lens and the optical engine cover together.

In an embodiment of the invention, the heat dissipation device for the projector further includes a heat insulation element, which is disposed between the shading element and the projection lens locking shell.

In an embodiment of the invention, the heat insulation element includes a rubber part or a plastic part.

In an embodiment of the invention, the heat dissipation part includes a heat dissipation fin.

In an embodiment of the invention, the spatial light modulator includes a digital micromirror device.

In summary, in the design of the heat dissipation device for a projector of the invention, the shading element including the heat dissipation part is disposed downstream of the optical path of the prism set to block the ineffective light beam from the prism set. In this way, the shading element irradiated by the ineffective light beam may export heat energy through its heat dissipation part, so as to effectively reduce a temperature inside the optical engine, and mitigate or prevent the thermal drift phenomenon of the projector. In addition, the configuration of the shading element may reduce not only the temperature inside the optical engine but also the temperature of the light valve and come with a light shading function.

To make the aforementioned more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
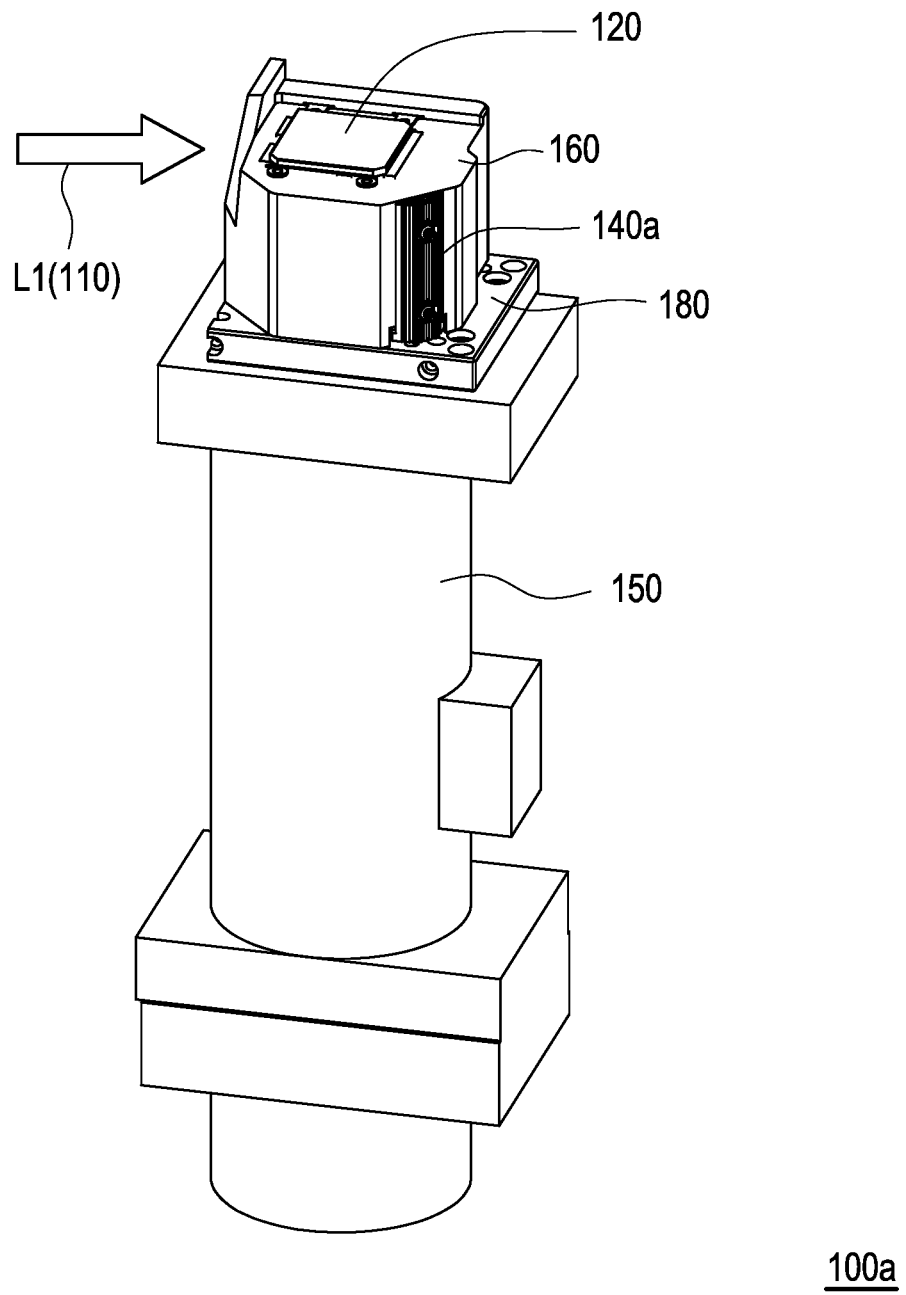
FIG. 1 is a schematic three-dimensional view of a heat dissipation device for projector according to an embodiment of the invention.
Figure 2:
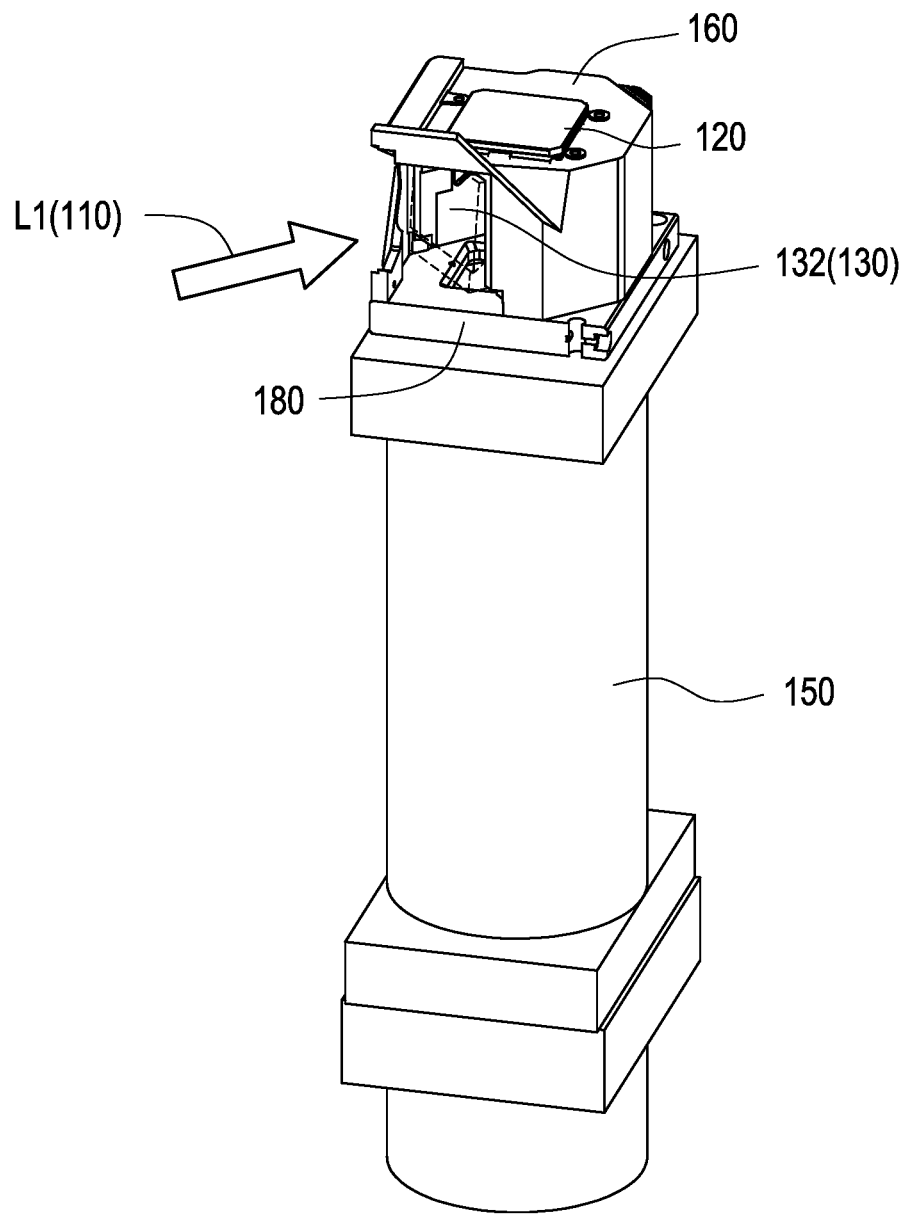
FIG. 2 is a schematic three-dimensional view of the heat dissipation device for projector in FIG. 1 from another viewing angle.
Figure 3:
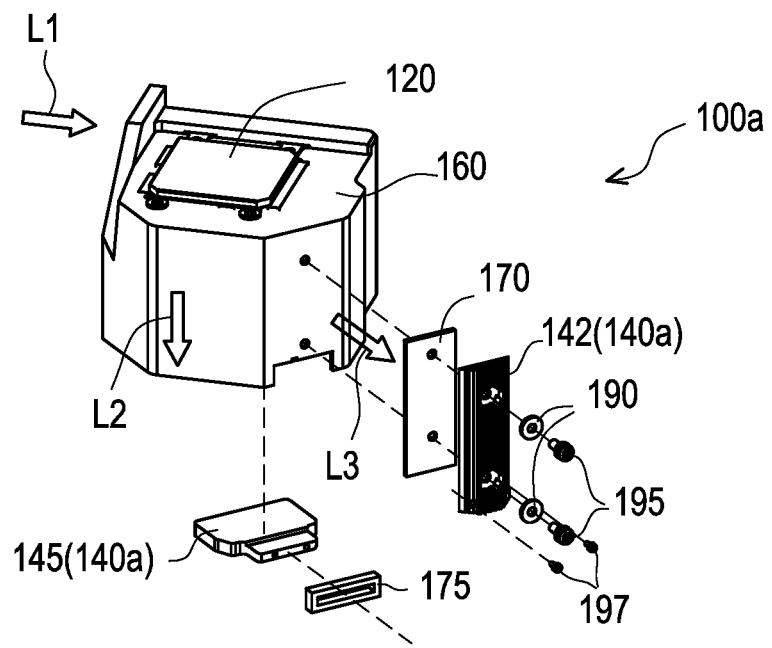
FIG. 3 is a schematic partial exploded view of the heat dissipation device for projector of FIG. 1.

FIG. 1 is a schematic perspective view of a heat dissipation device for projector according to an embodiment of the invention. FIG. 2 is a schematic three-dimensional view of the heat dissipation device for projector in FIG. 1 from another viewing angle. FIG. 3 is a schematic partial exploded view of the heat dissipation device for projector of FIG. 1.

Referring to FIG. 1, FIG. 2 and FIG. 3 at the same time, in the embodiment, a heat dissipation device 100a for projector includes a light source 110, a light valve 120, a prism set 130, a shading element 140a and a projection lens 150. The light source 110 may emit a light beam L1. The light valve 120 is disposed downstream of an optical path of the light source 110, and may receive the light beam L1, convert a part of the light beam L1 into image light L2, and convert another part of the light beam L1 into an ineffective light beam L3. The prism set 130 includes at least one prism 132, which may receive the image light L2 and the ineffective light beam L3. The shading element 140a includes a heat dissipation part 142. The shading element 140a is disposed downstream of an optical path of the prism set 130 to block the ineffective light beam L3 from the prism set 130. The projection lens 150 is disposed downstream of the optical path of the prism set 130.

In detail, the light source 110 is, for example, composed of a plurality of light emitting diodes (LED), which means that the light source 110 may be a LED light source. In some embodiments, the light source 110 may also be an ultra high pressure lamp (UHP lamp) or other suitable light sources, which is not limited by the invention. The light valve 120 is a spatial light modulator disposed downstream of the light source 110, and may convert the light beam L1 into a first partial light beam (i.e., the image light L2) and a second partial light beam (i.e., the ineffective light beam L3). In the embodiment, the light valve 120 is, for example, a digital micro-mirror device (DMD). However, in other embodiments, the light valve 120 may also be a liquid-crystal-on-silicon panel (LCOS panel), a transmissive liquid crystal panel, or other suitable forms of light valve modules, which is not limited by the invention.

Referring to FIG. 2 and FIG. 3 at the same time, the prism set 130 is disposed in an optical engine cover 160 and disposed downstream of an optical path of the light valve 120, where the prism 132 of the prism set 130 is, for example, a total internal reflection prism (TIR prism), but the invention is not limited thereto. The projection lens 150 is disposed downstream of an optical path of the prism set 130 and the first partial light beam (i.e., the image light L2). As shown in FIG. 1 and FIG. 2, the heat dissipation device 100a for projector further includes a projection lens locking shell 180, which may directly or indirectly lock the projection lens 150 and the optical engine cover 160 together. The heat dissipation part 142 of the shading element 140a is, for example, a heat dissipation fin, which is disposed downstream of an optical path of the prism set 130 and the second partial light beam (i.e., the ineffective light beam L3).

Referring to FIG. 3 again, in the embodiment, the heat dissipation device 100a for projector further includes a heat insulation element 170 disposed between the shading element 140a and the optical engine cover 160. Specifically, the shading element 140a includes the heat dissipation part 142 and a shading part 145 separated from each other. The heat insulation element 170 is, for example, a rubber part or a plastic part, and is disposed between the heat dissipation part 142 of the shading element 140a and the optical engine cover 160, and a screw 195 penetrates through a plastic gasket 190, the heat dissipation part 142 and the heat insulation element 170 and is locked on the optical engine cover 160. Here, the heat insulation element 170 and the plastic gasket 190 disposed between the screw 195 and the optical engine cover 160 may insulate heat.

In addition, the heat dissipation device 100a for projector further includes a heat insulation element 175 disposed between the shading element 140b and the projection lens locking shell 180. Specifically, the heat insulation element 175 is, for example, a rubber part or a plastic part, and is disposed at one end of the shading part 145 of the shading element 140a and located between the shading part 145 and the optical engine cover 160, where the shading part 145 and the heat dissipation part 142 are locked through a screw 197, but the invention is not limited thereto. The heat insulation element 175 may be for thermal insulation, so that the shading element 140a does not directly contact metal parts of the optical engine cover 160.

In brief, in the design of the heat dissipation device 100a for projector of the embodiment, the shading element 140a including the heat dissipation part 142 is disposed downstream of the optical path of the prism set 130 to block the ineffective light beam L3 from the prism set 130. In this way, the shading element 140a irradiated by the ineffective light beam L3 may radiate thermal energy through its heat dissipation part 142, so as to effectively reduce the temperature inside the optical engine, and reduce or avoid the thermal drift phenomenon of the projector. In addition, the arrangement of the shading element 140a may not only reduce the temperature inside the optical engine, but may also reduce the temperature of the light valve 120, and has a light shading function.

It should be noticed that reference numbers of the components and a part of contents of the aforementioned embodiment are also used in the following embodiment, where the same reference numbers denote the same or like components, and descriptions of the same technical contents are omitted. The aforementioned embodiment may be referred for descriptions of the omitted parts, and detailed descriptions thereof are not repeated in the following embodiment.

Figure 4:
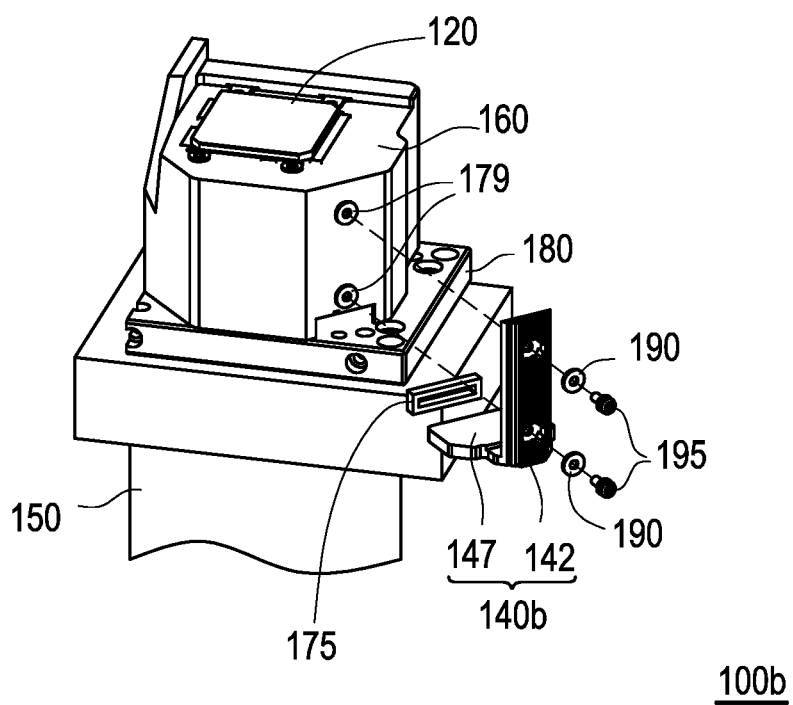
FIG. 4 is a schematic partial exploded view of a heat dissipation device for projector according to another embodiment of the invention.
Figure 5:
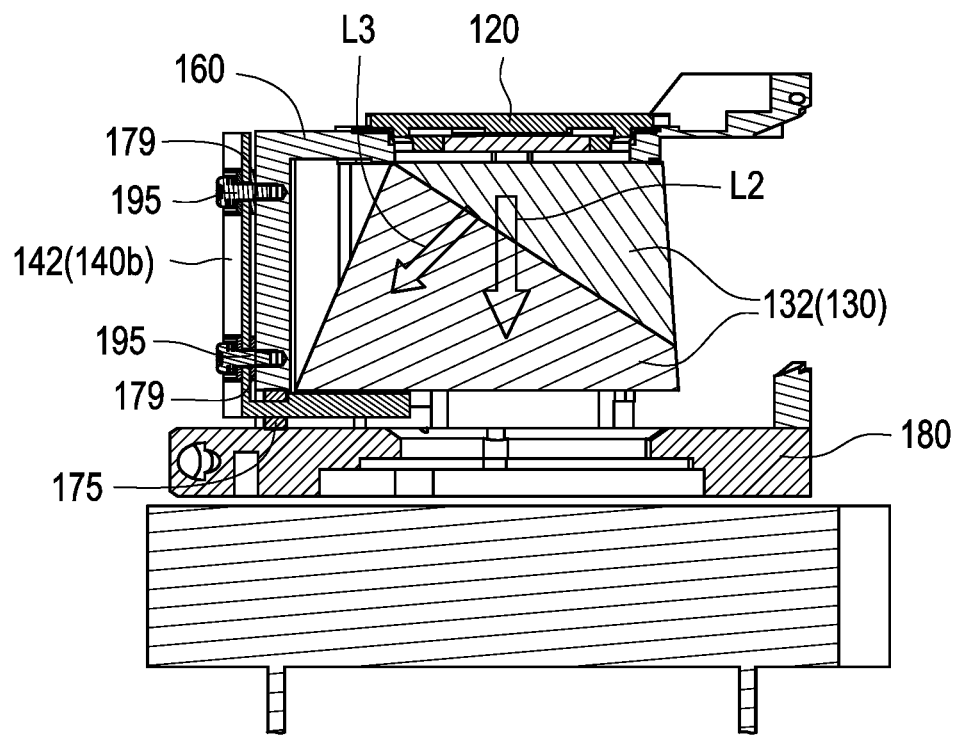
FIG. 5 is a schematic partial cross-sectional view of the heat dissipation device for projector of FIG. 4.

FIG. 4 is a schematic partial exploded view of a heat dissipation device for projector according to another embodiment of the invention. FIG. 5 is a schematic partial cross-sectional view of the heat dissipation device for projector of FIG. 4. Referring to FIG. 3, FIG. 4, and FIG. 5 at the same time, a heat dissipation device 100b for projector of the embodiment is similar to the heat dissipation device 100a for projector in FIG. 3, and differences there between are that the shading element 140b of the embodiment is an integrally formed structure, i.e., the heat dissipation part 142 and the shading part 147 are seamlessly connected, and an extending direction of the heat dissipation part 142 is perpendicular to an extending direction of the shading part 147, and the two parts presents an L-shape. The screw 195 penetrates through the plastic gasket 190, the heat dissipation part 142 and the heat insulation element 179 and is locked on the optical engine cover 160. The heat insulation element 179 and the plastic gasket 190 disposed between the screw 195 and the optical engine cover 160 may insulate heat. The heat insulation element 175 is sleeved on a side of the shading part 147 of the shading element 140a adjacent to the heat dissipation part 142 and is located between the shading part 145 and the optical engine cover 160, which may effectively insulate heat and prevent the shading element 140b from directly contacting the metal parts of the optical engine cover 160.

In summary, in the design of the heat dissipation device for a projector of the invention, the shading element including the heat dissipation part is disposed downstream of the optical path of the prism set to block the ineffective light beam from the prism set. In this way, the shading element irradiated by the ineffective light beam may export heat energy through its heat dissipation part, so as to effectively reduce a temperature inside the optical engine, and mitigate or prevent the thermal drift phenomenon of the projector. In addition, the configuration of the shading element may reduce not only the temperature inside the optical engine but also the temperature of the light valve and come with a light shading function.

It will be apparent to those skilled in the art that various modifications and variations can be made to the disclosed embodiments without departing from the scope or spirit of the invention. In view of the foregoing, it is intended that the invention covers modifications and variations provided they fall within the scope of the following claims and their equivalents.

What is claimed is:

1. A heat dissipation device for a projector, comprising:
a light source, for emitting a light beam;
a light valve, disposed downstream of an optical path of the light source, for receiving the light beam, converting a part of the light beam into image light, and converting another part of the light beam into an ineffective light beam;
a prism set, comprising at least one prism, and for receiving the image light and the ineffective light beam;
a shading element, disposed downstream of an optical path of the prism set, configured to block the ineffective light beam from the prism set, and comprising a heat dissipation part; and
a projection lens, disposed downstream of the optical path of the prism set,
wherein the prism set is disposed in an optical engine cover.

2. The heat dissipation device for the projector as claimed in claim 1, further comprising:
a heat insulation element, disposed between the shading element and the optical engine cover.

3. The heat dissipation device for the projector as claimed in claim 2, wherein the heat insulation element comprises a rubber part and a plastic part.

4. The heat dissipation device for the projector as claimed in claim 1, further comprising:
a projection lens locking shell, directly or indirectly locking the projection lens and the optical engine cover together.

5. The heat dissipation device for the projector as claimed in claim 4, further comprising:
a heat insulation element, disposed between the shading element and the projection lens locking shell.

6. The heat dissipation device for the projector as claimed in claim 5, wherein the heat insulation element comprises a rubber part and a plastic part.

7. The heat dissipation device for the projector as claimed in claim 1, wherein the heat dissipation part comprises a heat dissipation fin.

8. A heat dissipation device for a projector, comprising:
a light source, for emitting a light beam;
a spatial light modulator, disposed downstream of an optical path of the light source, and for converting the light beam into a first partial light beam and a second partial light beam;
a prism set, disposed downstream of an optical path of the spatial light modulator;
a projection lens, disposed downstream of an optical path of the prism set and the first partial light beam; and
a shading element, comprising a heat dissipation part and disposed downstream of an optical path of the prism set and the second partial light beam,
wherein the prism set is disposed in an optical engine cover and the heat dissipation part is apart from the optical engine cover.

9. The heat dissipation device for the projector as claimed in claim 8, further comprising:
a heat insulation element, disposed between the shading element and the optical engine cover.

10. The heat dissipation device for the projector as claimed in claim 9, wherein the heat insulation element comprises a rubber part or a plastic part.

11. The heat dissipation device for the projector as claimed in claim 8, further comprising:
a projection lens locking shell, directly or indirectly locking the projection lens and the optical engine cover together.

12. The heat dissipation device for the projector as claimed in claim 11, further comprising:
a heat insulation element, disposed between the shading element and the projection lens locking shell.

13. The heat dissipation device for the projector as claimed in claim 12, wherein the heat insulation element comprises a rubber part or a plastic part.

14. The heat dissipation device for the projector as claimed in claim 8, wherein the heat dissipation part comprises a heat dissipation fin.

15. The heat dissipation device for the projector as claimed in claim 8, wherein the spatial light modulator comprises a digital micromirror device.

16. The heat dissipation device for the projector as claimed in claim 1, wherein the shading element is disposed downstream of an optical path of the light valve for shading the ineffective light beam, and not on any other light path before the light beam enters the light valve.

17. The heat dissipation device for the projector as claimed in claim 8, wherein the shading element is disposed downstream of an optical path of the second partial light beam, and not on any other light path before the light beam enters the spatial light modulator.

* * * * *